(12) United States Patent
Danne et al.

(10) Patent No.: US 9,250,856 B2
(45) Date of Patent: Feb. 2, 2016

(54) IN-VEHICLE WEB PRESENTATION

(71) Applicant: Myine Electronics, Inc., Ferndale, MI (US)

(72) Inventors: Philip Joseph Danne, Royal Oak, MI (US); Jacob R. Sigal, Ferndale, MI (US); Scott Smereka, Warren, MI (US); Joey Ray Grover, Madison Heights, MI (US)

(73) Assignee: Myine Electronics, Inc., Ferndale, MI (US)

( * ) Notice: Subject to any disclaimer, the term of this patent is extended or adjusted under 35 U.S.C. 154(b) by 0 days.

(21) Appl. No.: 14/257,491

(22) Filed: Apr. 21, 2014

(65) Prior Publication Data

US 2015/0301794 A1    Oct. 22, 2015

(51) Int. Cl.
*G06K 7/10*    (2006.01)
*G06F 3/16*    (2006.01)
*G06F 17/22*   (2006.01)
*B60R 16/037*  (2006.01)
*B60K 35/00*   (2006.01)

(52) U.S. Cl.
CPC ............ *G06F 3/167* (2013.01); *G06F 17/2247* (2013.01); *B60K 35/00* (2013.01); *B60K 2350/1096* (2013.01); *B60K 2350/357* (2013.01); *B60R 16/0373* (2013.01)

(58) Field of Classification Search
CPC .............. B60K 2350/1096; B60K 2350/357; B60K 35/00; B60R 16/0373; G06F 3/167; G06F 17/2247

USPC ..................................................... 235/472.01
See application file for complete search history.

(56) References Cited

U.S. PATENT DOCUMENTS

| | | | |
|---|---|---|---|
| 2005/0179540 A1* | 8/2005 | Rubenstein | 340/539.18 |
| 2007/0067415 A1* | 3/2007 | Kawaguchi | 709/217 |
| 2010/0082780 A1* | 4/2010 | Muilenburg et al. | 709/221 |
| 2011/0145863 A1* | 6/2011 | Alsina et al. | 725/44 |
| 2012/0179325 A1* | 7/2012 | Faenger | 701/31.4 |
| 2012/0226742 A1* | 9/2012 | Momchilov et al. | 709/203 |
| 2013/0066947 A1* | 3/2013 | Ahmad et al. | 709/203 |
| 2013/0073958 A1* | 3/2013 | Tom | 715/716 |
| 2014/0006555 A1 | 1/2014 | Shields | |
| 2014/0032015 A1 | 1/2014 | Chun et al. | |
| 2014/0128053 A1* | 5/2014 | Merchant | 455/419 |

* cited by examiner

*Primary Examiner* — Thien M Le
*Assistant Examiner* — Claude J Brown
(74) *Attorney, Agent, or Firm* — Brooks Kushman P.C.

(57) ABSTRACT

One or more controller may extract voice commands from retrieved web content, format the web content according to vehicle computing system (VCS) specific formatting information, provide the formatted web content for display by the VCS, and update the recognized voice commands of the VCS according to the extracted voice commands. A server may identify whether a received web request for web content is directed to a vehicle sub-domain for providing an in-vehicle-specific version of the content, identify whether the received web request is for presentation of web content via a VCS, and redirect the web request to the vehicle sub-domain when the request is not directed to the vehicle sub-domain and is for presentation via the VCS.

18 Claims, 5 Drawing Sheets

IN-VEHICLE WEB PRESENTATION

TECHNICAL FIELD

The illustrative embodiments generally relate to web-based data presentation within the vehicle environment.

BACKGROUND

In-vehicle infotainment systems may offer Internet connectivity by integration with smartphone applications configured to provide particular web content. However, such systems require the user to install dedicated applications to access the content, and restrict the amount and type of information the user may retrieve to the limited user interface elements of the installed applications.

SUMMARY

In a first illustrative embodiment, a system includes at least one controller configured to extract voice commands from retrieved web content, format the web content according to vehicle computing system (VCS) specific formatting information, provide the web content as formatted for display by the VCS, and update voice commands of the VCS according to the voice commands as extracted.

In a second illustrative embodiment, a computer-implemented method includes extracting voice commands from retrieved web content, formatting the web content according to vehicle computing system (VCS) specific formatting information, providing the web content as formatted for display by the VCS, and updating voice commands of the VCS according to the voice commands as extracted.

In a third illustrative requirement, a system includes a server configured to identify whether a received web request for web content is directed to a vehicle sub-domain for providing an in-vehicle-specific version of the content, identify whether the received web request is for presentation of web content via a vehicle computing system (VCS), and redirect the web request to the vehicle sub-domain when the request is not directed to the vehicle sub-domain and is for presentation via the VCS.

DETAILED DESCRIPTION

Figure 1:
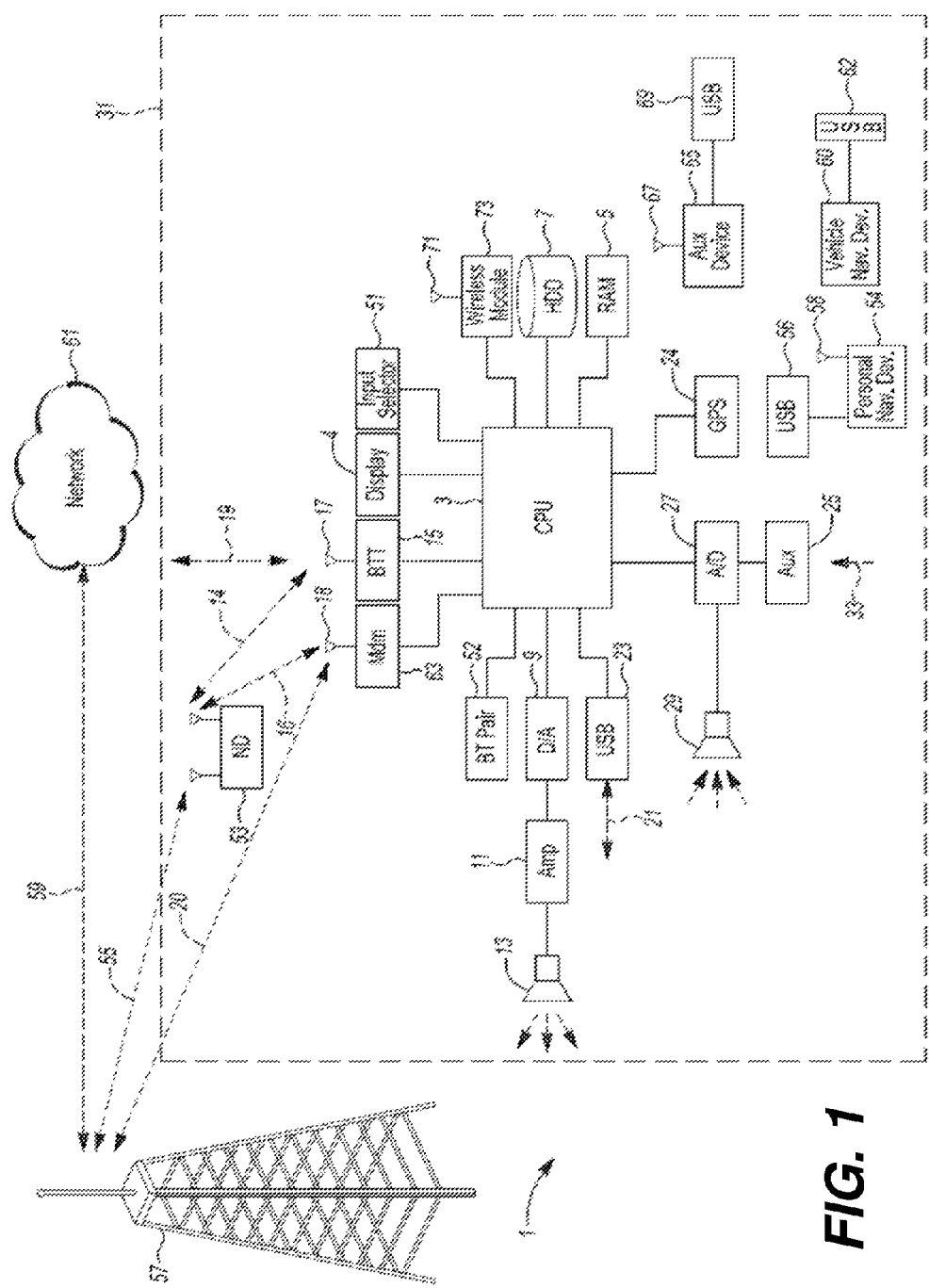
FIG. 1 is an exemplary block topology of a vehicle infotainment system implementing a user-interactive vehicle based computing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It may be desirable to bring web content into the vehicle environment. However, due to a lack of standards for user interface layout, browsing websites on the public Internet may be unsafe when performed by a driver of a vehicle. For example, web interfaces may include small buttons that are difficult to manipulate, large amounts of text or other content on the screen, or embedded objects such as animations and video that may distract a driver. Moreover, features that may be useful for in-vehicle web browsing, such as tightly-integrated hands-free voice control and response time guarantees for acknowledgement of user requests may be unavailable. Due to these and other safety concerns, in-vehicle infotainment systems may prevent users from performing basic web browsing tasks, such as preventing use of search engines to obtain results on a topic, or disallowing the following of hyperlinks from one web page to another.

An improved web content system may utilize a defined standard of allowable web content for use within the vehicle context. These standards may include including requirements for user interface layout, restrictions on objects or other elements that are allowed (e.g., limitations on embedded animations or media), tightly-integrated hands-free voice control, and rapid acknowledgement of user requests. To allow vehicles to request content conforming to the standard, the standard may include a definition of one or more subdomains designated for hosting content suitable for use in the vehicle context. Accordingly, web content in compliance with the in-vehicle standard may be retrieved by the vehicle by accessing the in-vehicle subdomain. Moreover, web developers creating content for use in vehicles may be able to publish the content to the in-vehicle subdomain, without having to understand or otherwise being qualified to create interfaces that confirm to in-vehicle safety regulations.

When received by an in-vehicle web browser, the web content may be validated by according to the standard to ensure that only allowable content is included. The in-vehicle web browser may further format the received web content in accordance with the particular formatting information requirements and preferences of the receiving vehicle. The formatting information may include, for example screen size and resolution information for the intended display, preferred colors, available hardware buttons, manufacturer-specific branding, total number of elements that may be displayed, and position of the elements that may be displayed, as some examples. Based on the formatting information, the web browser client may format the size, text wrapping, color, shape, location, and other aspects of the elements of web content to be in conformance with the specifications of the available vehicle display. Moreover, the in-vehicle web browser client may set up voice commands with the vehicle, according to voice command tag information defined in the standard, such names or functions indicated in the web content may be invoked by the use via speech. Thus, by use of a system of in-vehicle web standards and dedicated subdomains, a user may access content from the public Internet in a manner that is safe for use inside of the vehicle context.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
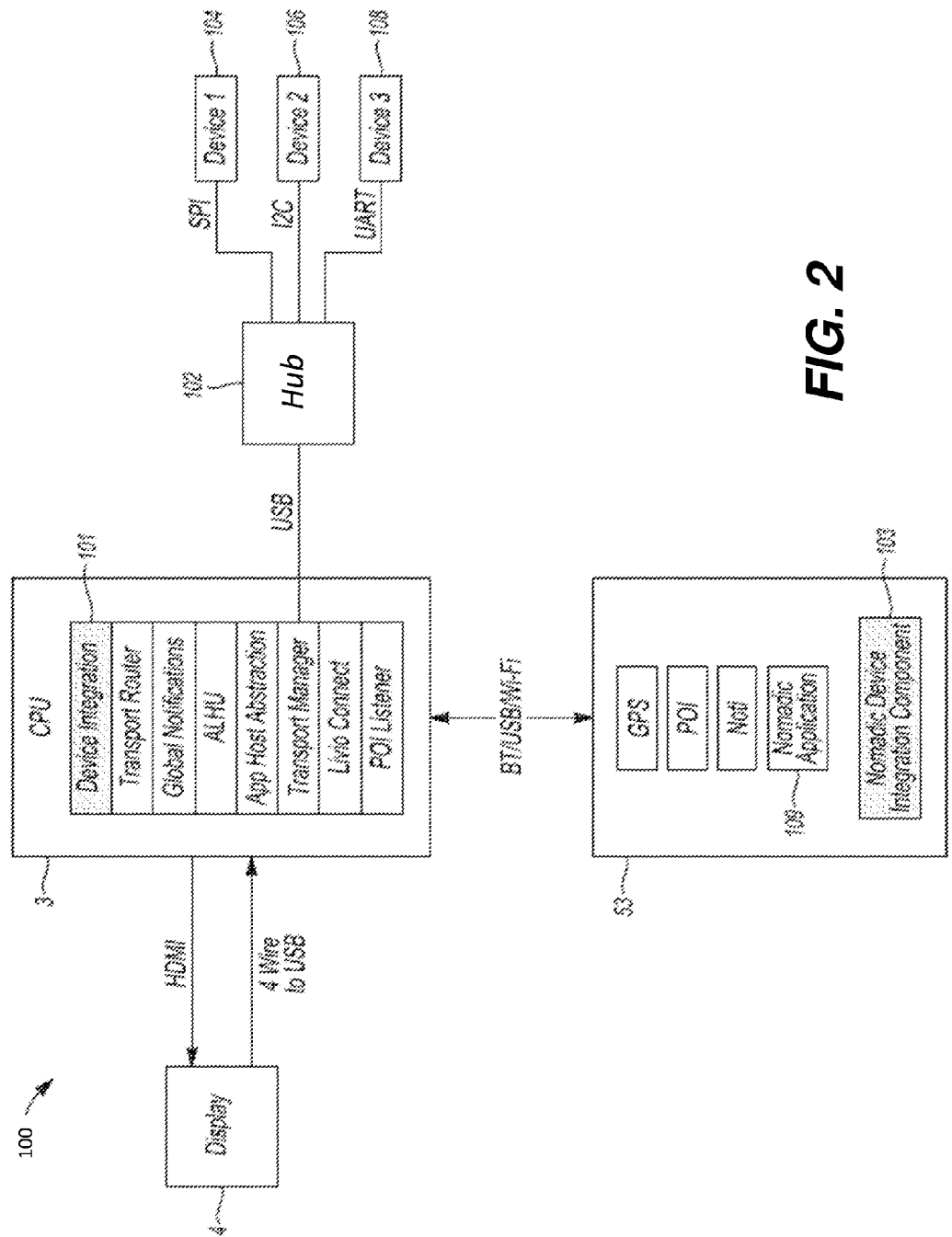
FIG. 2 is an exemplary block topology of a system for integrating one or more connected devices with the vehicle based computing system.

FIG. 2 is an exemplary block topology of a system 100 for integrating one or more connected devices with the vehicle based computing system 1 (VCS). To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. Applications 109 executed by the nomadic device 53 may accordingly utilize the device integration client component 103 to interact with the CPU 3 via the device integration framework 101. As one example, a music player application on the nomadic device 53 may interact with the CPU 3 to provide streaming music through the speaker 13 or stereo system output of the VCS 1. As another example, a navigation application on the nomadic device 53 may interact with the CPU 3 to provide turn-by-turn directions for display on the screen 4 of the VCS 1. As yet a further example, a web browser client application on the nomadic device 53 may interact with the CPU 3 to provide web browsing functionality via the audio and video display features of the VCS 1.

The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108. As one possibility, multiport connector hub 102 may be utilized by an in-vehicle web browser to support connection of an external modem, instead of or in addition to use of the onboard modem 63.

Figure 3:
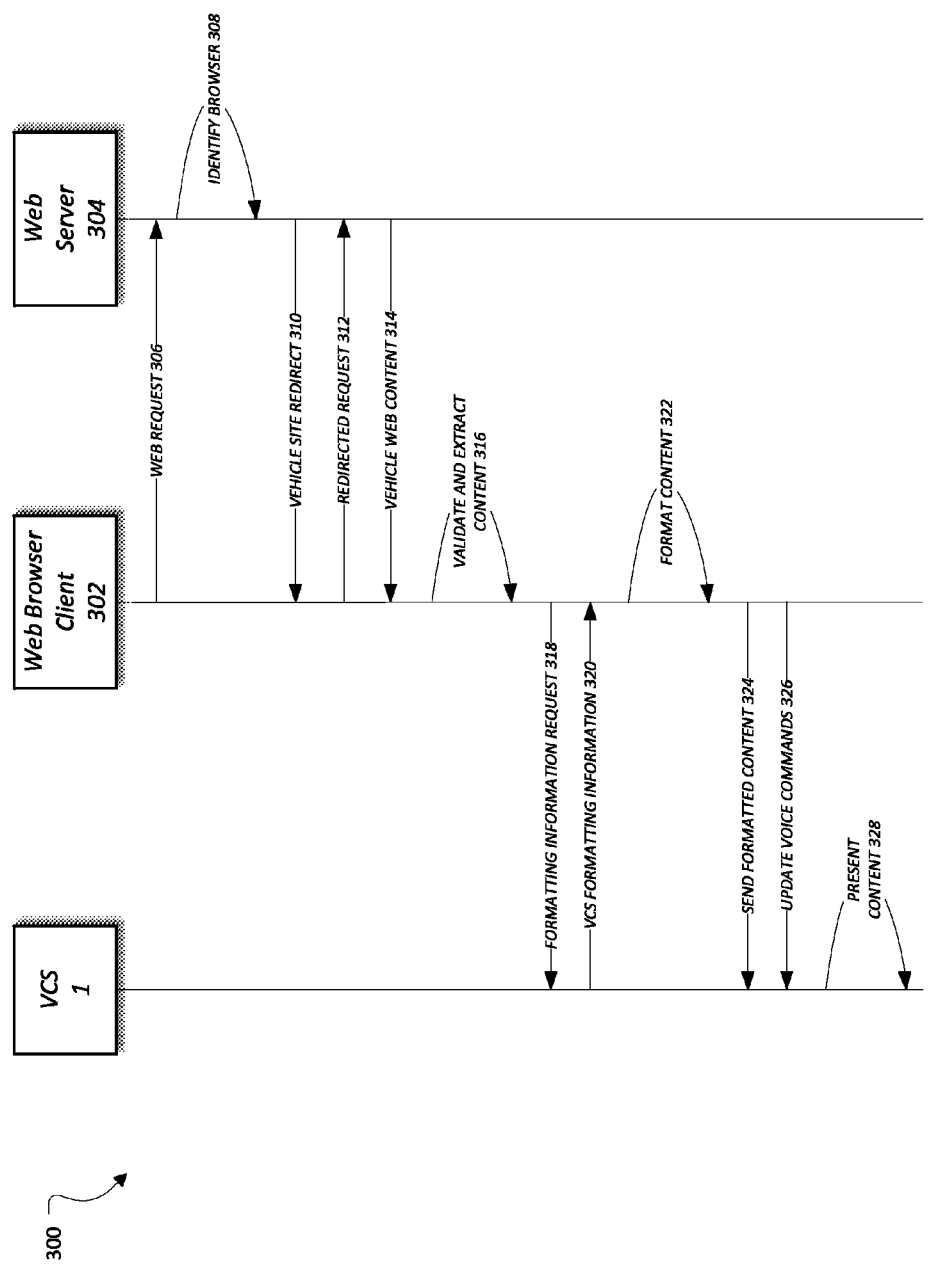
FIG. 3 is an exemplary data flow between a web browser client communicating with the vehicle based computing system and a web server.

FIG. 3 is an exemplary data flow 300 between a web browser client 302 communicating with the VCS 1 and a web server 304. The web server 304 may include hardware (e.g., a computing device) as well as any necessary software configured to deliver web content via the a network 61 (e.g., the Apache HTTP Server maintained by the Apache Software Foundation, the Internet Information Services server maintained by Microsoft, Inc.). The web browser client 302 may include hardware (e.g., the VCS 1, communication functionality of the nomadic device 53, etc.) as well as any necessary software for retrieving, presenting and traversing information resources on the World Wide Web (e.g., the Firefox web browser software maintained by the Mozilla Foundation, the Google Chrome web browser software maintained by Google. Inc., the Internet Explorer web browser software maintained by Microsoft, Inc., etc.) The exemplary data flow 300 may be initiated, for example, by a user initiating a web request 306 to navigate to a website. The navigate request 306 may be initiated in various ways, such as by a user clicking on a universal resource locator (URL) displayed in the web browser client 302, the user clicking on a URL displayed in another application, or by the user speaking a navigate voice command to a voice command interface of the VCS 1.

When a web browser client 302 connects to a web server 304 in making the web request 306, the web browser client 302 may provide information to the server 304 to allow the server 304 to identify the web browser client 302 version and capabilities. For example, the web browser client 302 may be configured to provide user-agent information in the request 306 header indicating that the web browser client 302 is vehicle-based. As some examples, the web browser client 302 may include vehicle-identifying information in the user-agent string such as: a name of the web browser client 302 associated with in-vehicle contexts, a word or phrase such as vehicle or in-vehicle, or some other indication in the user agent string that the web browser client 302 is situated in the vehicle context.

The server 304 may receive the web request 306, and may identify 308 the capabilities and/or eccentricities of the browser client 302 based on the web request 306. As one possibility, the server 304 may compare the received user-agent string in the header of the web request 306 with a database of user-agent strings and associated devices. As another possibility, the server 304 may search to see if certain substrings are included in the user-agent string, such as searching for the name of the web browser client 302 or other indication that the client is a vehicle 31. Based on the web request 306, the server 304 may determine that the web request 306 is provided by an in-vehicle browser client 302.

Upon determining that the request 306 is from a vehicle 31, the server 304 may be configured to provide a redirect message 310 to back the client 302, to cause the browser client 302 to provide a redirected request to navigate to the vehicle-specific content 314 version of the webpage being requested. The vehicle-specific content 314 may be configured to adhere to a set of standards for safe operation in the vehicle 31, including standards for user interface layout, restrictions on objects allowed (e.g., limitations on embedded animations or media), tightly-integrated hands-free voice control, and rapid acknowledgement of user requests. The vehicle-specific content 314 may accordingly provide a customized, but safe, interface to Internet content for both driver and passenger users within vehicles.

As one possibility, the standard for in-vehicle web content may include a whitelisted subset of HTML5 tags or elements that are designed to be used in the vehicle environment. As a more specific example, the standard for in-vehicle web content may include a set of tags or elements such as: a tag for primary text; a tag for descriptive text; a tag for a text box that may contain multiple lines of data and/or a "document" container; a tag for images; a tag for video streams (e.g., disabled unless the vehicle 31 is in Park); a tag for audio streams; tags for form controls such as buttons and lists with which the user may interact; a set of form or dialog tags to provide "pop-up" dialogs to alert a user to an error or to allow a user to make a selection; a tag to provide a search interface; and one or more menu tag to provide a multi-tiered menu structure (though this may be organized as a separate web page).

By defining a finite set of tags or other elements for allowable web content as a standard, web content in conformance with the standard may then be brought into the vehicle 31 without a web developer necessarily understanding or otherwise being required to abide by in-vehicle safety regulations. For instance, information related to content formatting would be mostly absent in the standard, with the exception of basic layout information (e.g. what order items appear on the screen, which items are most important or least important, etc.). The web browser client 302 rendering the content would then be configured to control the formatting of the in-vehicle web content data. As some example, the web browser client 302 may be configured to ensure that text is large enough to read based on the parameters of the display 4, that text on a control or other tag and does not exceed a limited number of words or space, that the web content may scroll in a safe manner (e.g., only in a vertical direction), ensuring buttons are large and easy to press via touch input, limiting video playback to times when the vehicle 31 is stationary or in Park, etc.

The vehicle-specific content 314 of the webpage to which the browser client 302 is redirected may be a subdomain of the requested URL. Accordingly, the vehicle-specific subdomain may be a location known by in-vehicle web browser clients 302 to be a place from which vehicle-specific content, if offered, would be available. As some examples, the subdomain may be "c.example.com," where "c" is the dedicated subdomain (short for "car") and "example.com" is the website domain name. Other exemplary dedicated subdomains may include "car," "v" (short for "vehicle"), "vehicle," or "ivi" (short for "in-vehicle infotainment").

It should be noted that in some cases, the web browser client 302 may directly request 306 to access the page by using the subdomain of the requested URL (or automatically forward itself to the subdomain). In such cases, the web server 304 may still be configured to ensure that the requesting browser client 302 is a vehicle-based client 302, and if not, redirect the browser client 302 away, such as to a main page or mobile page, as appropriate (not shown). This added check may accordingly address cases where a non-vehicle browser client 302 follows a URL to a vehicle-specific page, but where a non-vehicle browser client 302 is either unable to support in-vehicle formatted content, or may provide a better user experience if another non-vehicle version of the web page is provided instead.

The web browser client 302 may be configured to receive the vehicle web content 314 from the web server 304. For example, the web browser client 302 may be configured to perform HTTP get requests to the redirected subdomain as well as further requests to any additional included or linked to content of the web page.

Once received, the web browser client 302 may be configured to validate 316 the vehicle web content 314 to ensure that it confirms to the requirements for in-vehicle use. For example, the web browser client 302 may be configured to ensure that unsupported formatting information is not included in the web content (or optionally strip out any such content if it is included). As another example, the web browser client 302 may be configured to ensure that tags indicative of selectable items (such as buttons, video streams, or audio streams) include metadata for supporting voice command control of the selectable items, as well as to add voice commands to the VCS 1 vocabulary related to the selectable controls of the received web content 314 when the web content 314 is displayed.

For example, tags for button controls may be verified to include metadata indicating the name or function of the button (e.g. "Yes", "Cancel"). This information may then be used by the web browser client 302 to set up voice commands with the VCS 1, such that the indicated names or functions may be used to allow the user to invoke the button via voice command (e.g., by saying "Yes", "Cancel", etc.). In some cases, to ensure the quality of the voice recognition, the set of names or functions may be chosen from a defined list of commands.

As another example of voice command identification, tags for audio content may include a command identifier prefix (e.g. "Play") and an indication of the content to be played (e.g., artist name), such that the web browser client 302 may be configured to define a voice command related to the content, such as "Play <artist name>", that recognized by the VCS 1 is configured to cause the audio content indicated by the tagged item to be played via the VCS 1.

As a further example of voice command identification, tags for search controls may include a speech-to-text tag, such that web content 314 may provide a customized voice commands configured to invoke search functionality. The customized voice command may include a branded or language-specific prefix, such as: "Find, "Search for," "Google" or, in other languages, "Kutafuta," or "Hledání," as some examples.

The web browser client 302 may be further configured to format the received web content 314 according to the requirements of the VCS 1. To receive the requirements of the VCS 1, the web browser client 302 may be configured to provide a formatting information request 318 to the VCS 1. Responsive to the request 318, the VCS 1 may return to the VCS 1 formatting information 320.

The received formatting information 320 may include information such as screen size and resolution of the display 4 of the VCS 1, preferred colors, available hardware buttons, manufacturer-specific branding and other information relating to the display of content on the VCS 1. Based on the received formatting information 320, the web browser client 302 may format 322 the size, text wrapping, color, shape, and other aspects of the web content 314 to be in conformance with the specifications of the display 4 of the VCS 1, and also in conformance with any manufacturer-specified scheme or branding.

As one possibility, the web browser client 302 may format 322 the received web content 314 by using a cascading style sheet. For instance, the web browser client 302 may receive a cascading style sheet from the VCS 1 as formatting information 320, and may apply the received style sheet to the web content 314 to cause the web content 314 to be configured in conformance with the color, size, location, or other requirements of the VCS 1 specified by the sheet. Or, the web browser client 302 may create or update cascading style sheet (e.g., by filling in information such as font sizes, colors, and screen locations received from the VCS 1 in the formatting information 320), and may apply the created or updated style sheet to the web content 314 to cause the web content 314 to be configured in conformance with the color, size, location, or other requirements of the VCS 1.

As a further possibility, the received formatting information 320 may include one or more templates (or may specify or configure color, size, and location aspects one or more templates of the web browser client 302), where each of the templates defines a particular layout of web content 314. Each template may include a set of fields or elements (e.g., a title label, an image placeholder, a set of buttons at predefined locations, a set of content elements at predefined locations) that may be referenced (e.g., by identifier or order) within the web content 314. In such an example, the web content 314 may include an identifier of a corresponding user-interface template to be used. Based on the template identifier of the web content 314, the web browser client 302 may be configured to match the web content 314 to an appropriate user interface template of the VCS 1. The web browser client 302 may be further configured to load the web content 314 into the fields or other elements of the matched template (e.g., according to identifiers or ordering of the web content 314), such that the elements of the web content 314 may be formatted in a manner suitable for presentation via the VCS 1. The web browser client 302 may be configured to hide the content elements of the matched template for which no data is available in the web content 314. This accordingly provides for a measure of customization to the matched template, to allow the formatted web content 314 to appear more specifically designed than may be possible with a displayed template 300 including empty and unavailable controls.

The web browser client 302 may utilize in-vehicle environment-specific functionality of the web browser client 302 to format 322 the received web content 314, including to perform the template matching, element match filling and visibility updating formatting aspects. For example, the web browser client 302 may utilize a vehicle-formatting browser extension, JavaScript specific to the vehicle environment, or a built-in vehicle-formatting code module of the web browser client 302 to format 322 the web content 314 in conformance with the indicated template or other formatting information 320 corresponding to the VCS 1.

Once formatted 322, the web browser client 302 may be configured to send the formatted web content 314 to the VCS 1. The web browser client 302 may be further configured to update the voice commands 326 based on the metadata tags for the interactive controls. The VCS 1 may accordingly present the content 328 to the driver via the display 4 and be ready to receive user input according to push-to-talk functionality of the VCS 1.

Figure 4:
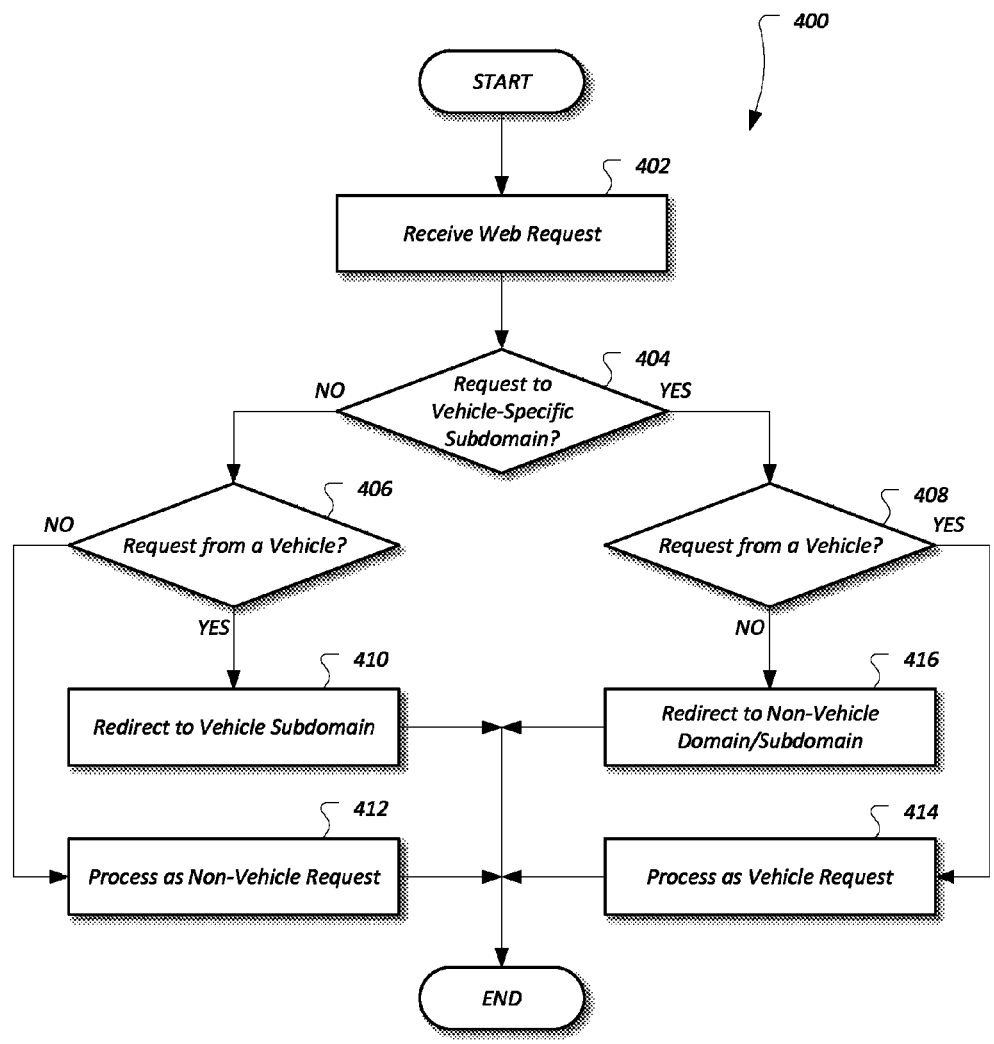
FIG. 4 is an exemplary process for redirecting web browsers to in-vehicle web content.

FIG. 4 is an exemplary process 400 for redirecting web browsers 302 to in-vehicle web content 314. The process 400 may be performed, for example, by a web server 304 in communication with a web browser (such as the web browser client 302 executed by a nomadic device 53 in communications with a CPU 3 of a VCS 1 of a vehicle 31). In other embodiments, the process 400 may be implemented in other controllers, or distributed amongst multiple controllers.

At block 402, the web server 304 receives a web request 306. For example, the web server 304 may receive the web request 306 via the network 61 from the web browser client 302. The web browser client 302 may have provided the request in various ways, such as by a user clicking on a URL displayed in the web browser client 302, the user clicking on a URL displayed in another application, or by way of a navigate voice command given to the VCS 1 by the user.

At decision block 404, the web server 304 determines whether the web request 306 is to a vehicle-specific sub-domain. For example, the web server 304 may determine whether the requested URL is to a vehicle-specific subdomain, such as: "c.example.com," "car.example.com," "v.example.com," "vehicle.example.com," or "ivi.example.com." If the web request 306 is not to the vehicle-specific sub-domain, control passes to decision block 406. Otherwise, control passes to decision block 408.

At decision block 406, the web server 304 determines whether the web request 306 is for presentation by the VCS 1 of the vehicle 31. For example, the web server 304 may search for include vehicle-identifying information in user-agent information included in the header of request 306 indicating that the request 306 is vehicle-based, such as a name of the web browser client 302 or another indication in the user agent string that the web browser client 302 is situated in the vehicle context. If the web request 306 is for presentation by the VCS 1, control passes to block 410. Otherwise, control passes to block 412.

At decision block 408, and similar to the decision block 406, the web server also determines whether the web request 306 is for presentation by the VCS 1 of the vehicle 31. If the web request 306 is for presentation by the VCS 1, control passes to block 414. Otherwise, control passes to block 416.

At block 410, the web server 304 redirects the web request 306 to the vehicle-specific sub-domain. For example, the web server 304 may provide a redirect message 310 to the web browser client 302 to redirect the web browser client 302 from the main domain (e.g., "www.example.com") to the vehicle-specific subdomain utilized by the web server 304, such as: "c.example.com," "car.example.com," "v.example.com," "vehicle.example.com," or "ivi.example.com." After block 410 the process 400 ends. It should be noted that when the vehicle site redirect 310 is received by the web client browser 302, the process 400 may be restarted responsive to the web browser client 302 providing the redirected request 312 for the in-vehicle web content 314 to navigate to the vehicle-specific version of the webpage being requested.

At block 412, the web server 304 processes the web request 306 as a non-vehicle web request 306. For example, the web browser client 302 may perform HTTP get requests for the requested web page from the main domain, as well additional requests 306 for any additional included content of the web page. Responsive to the requests, the web server 304 may return web content responsive to the web request 306 in a format suitable for a non-vehicle context, such as for desktop computers or for mobile devices. After block 412, the process 400 ends.

At block 416, the web server 304 redirects the web request 306 to the non-vehicle-specific sub-domain. For example, the web server 304 may redirect the web request 306 to the main domain (e.g., "www.example.com"). After block 416, the process 400 ends.

At block 414, the web server 304 processes the web request 306 as a vehicle web request 306. For example, the web browser client 302 may perform HTTP get requests for the requested web page from the vehicle-specific subdomain, as well additional requests 306 for any additional included content of the web page. Responsive to the requests, the web server 304 may return web content responsive to the web request 306 in a format suitable for the in-vehicle context. The vehicle-specific version may adhere to a set of standards for safe operation in the vehicle 31, including standards for user interface layout, restrictions on objects allowed (e.g., limitations on embedded animations or media), tightly-integrated hands-free voice control, and rapid acknowledgement of user requests. After block 414, the process 400 ends.

Figure 5:
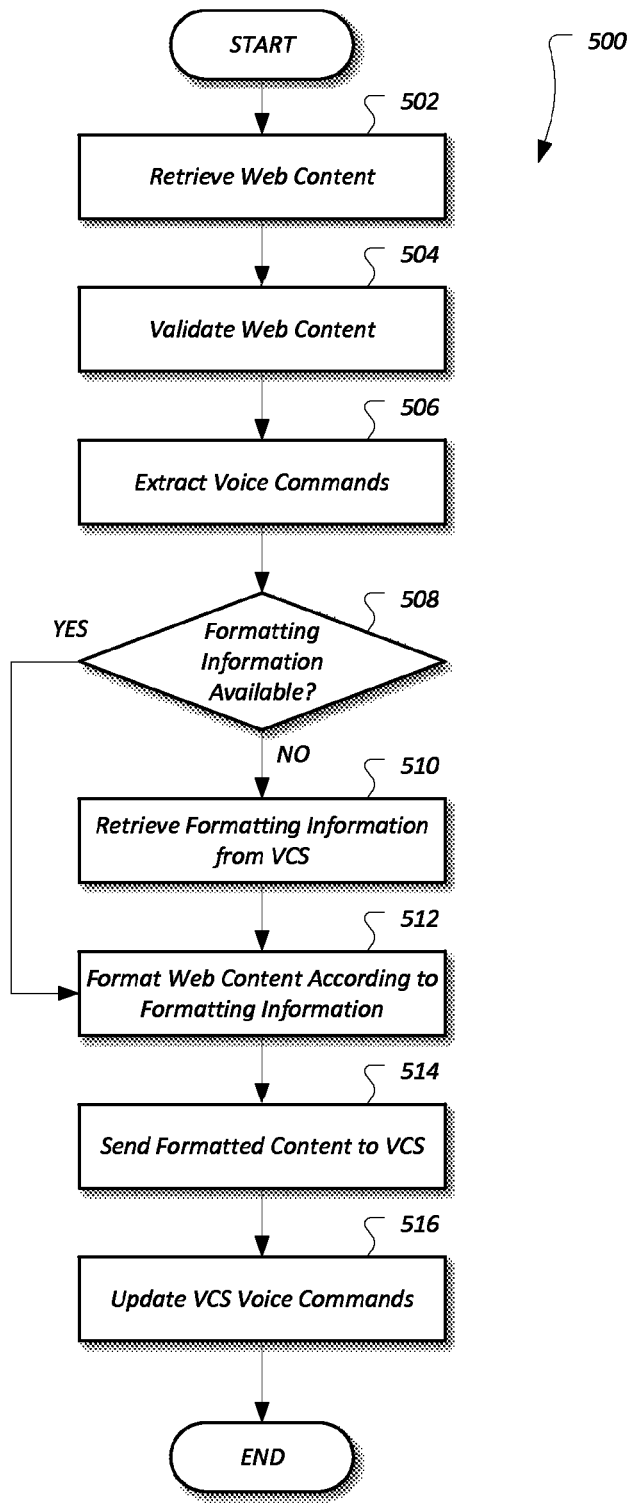
FIG. 5 is an exemplary process for displaying in-vehicle web content via a vehicle based computing system.

FIG. 5 is an exemplary process 500 for displaying in-vehicle web content via the VCS 1. The process 500 may be performed, for example, by nomadic device 53 executing a web browser client 302 and in communication with a CPU 3 of a VCS 1 of a vehicle 31. In other embodiments, the process 500 may be implemented in other controllers, or distributed amongst multiple controllers.

At block 502, the web browser client 302 retrieves web content from the web server 304. For example, the web browser client 302 may perform HTTP get requests from a vehicle-specific subdomain of a web server 304 in order to retrieve vehicle web content 314 from the web server 304.

At block 504, the web browser client 302 validates the vehicle web content 314. For example, the web browser client 302 may validate 316 the web content 314 to ensure that unsupported formatting information is not included in the web content 314. As another possibility, the web browser client 302 may strip out any unsupported formatting information or other content inappropriate to the in-vehicle context if it is included. As another example, the web browser client 302 may ensure that tags indicative of selectable items (such as buttons, video streams, or audio streams) include metadata for supporting voice command control of the selectable items, as well as to add voice commands to the VCS 1 vocabulary related to the selectable controls of the received web content 314 when the web content 314 is displayed.

At block 506, the web browser client 302 extracts voice commands from the vehicle web content 314. For example, the web browser client 302 may extract 316 and retrieve the tag metadata indicating the name or function of selectable controls of the vehicle web content 314 (e.g. "Yes", "Cancel"). The web browser client 302 may utilize the retrieved content to set up a set of voice commands such that the indicated names or functions may be used to allow the user to invoke the button via voice command (e.g., by saying "Yes", "Cancel", etc.).

At decision block 508, the web browser client 302 determines whether the web browser client 302 has formatting information available for the VCS 1 with which the web browser client 302 is being integrated. For example, the web browser client 302 may determine whether it has cached VCS 1 formatting information 320 from a previous formatting information request 318 to the VCS 1 (e.g., within the same execution of the web browser client 302). If not, control passes to block 510. Otherwise, control passes to block 512. It should be noted that, in some examples, decision block 508 is omitted and control simply passes from block 506 to block 510.

At block 510, the web browser client 302 retrieves formatting information from the VCS 1. For example, the web browser client 302 may be configured to provide a formatting information request 318 to the VCS 1. Responsive to the request 316, the VCS 1 may return to the VCS 1 formatting information 320. The received formatting information 320 may include information such as screen size and resolution of the display 4 of the VCS 1, preferred colors, available buttons, and other information relating to the display of content on the VCS 1, such as manufacturer-specific branding. As one possibility, the received formatting information 320 may include one or more cascading style sheets defining formatting to be applied to web content 314 to be displayed on the VCS 1. As another possibility, the received formatting information 320 may include information from the web browser client 302 to be used to create or update a cascading style sheet (e.g., by filling in information such as font sizes and colors received from the VCS 1 in the formatting information 320). As a further possibility, the received formatting information 320 may include one or more templates defining particular layouts of web content 314 to be matched to template identifiers of received web content 314.

At block 512, the web browser client 302 formats the vehicle web content 314 in accordance with the retrieved formatting information. Based on the received information 318, the web browser client 302 may format 322 the size, text wrapping, color, shape, and other aspects of the web content 314 to be in conformance with the specifications of the display 4 of the VCS 1, and also in conformance with any manufacturer-specified scheme or branding. For example, the browser client 302 may apply the received, updated or created cascading style sheet or sheets to the web content 314. As another example, the browser client 302 may match an identifier of a corresponding user-interface template included in the web content 314 to one of the received templates, and may match and format the web content 314 in accordance with the identified one of the received templates.

At block 514, the web browser client 302 sends 324 the formatted vehicle web content 314 to the VCS 1 for display. At block 516, the web browser client 302 provides updated voice command information 326 to the VCS 1. The VCS 1 may accordingly present the content 328 to the driver via the display 4 and be ready to receive user input according updated command applied to the to push-to-talk functionality of the VCS 1. After block 516, the process 500 ends.

Referring again to FIGS. 4 and 5, the vehicle 31 and its components illustrated in FIGS. 1-3 are referenced throughout the discussion of the processes 400 and 500 to facilitate understanding of various aspects of the present disclosure. The processes 400 and 500 may be implemented through a computer algorithm, machine executable code, or software instructions programmed into a suitable programmable logic device(s) of the vehicle 31, such as the vehicle 31 control module, the hybrid control module, another controller in communication with the VCS 1, or a combination thereof. Although the various steps shown in the processes 400 and 500 appear to occur in a chronological sequence, at least some of the steps may occur in a different order, and some steps may be performed concurrently or not at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   web content including hypertext markup tags and voice commands defined for voice control of the hypertext markup tags; and
   at least one controller programmed to
      extract the voice commands from the web content,
      provide the web content for display, formatted according to vehicle computing system (VCS) specific formatting information, and
      update a voice command interface of the VCS according to the voice commands as extracted.

2. The system of claim 1, the at least one controller further programmed to validate the web content as being in compliance with in-vehicle web standard requirements.

3. The system of claim 2, wherein the in-vehicle web standard requirements include at least one of: restrictions on allowable web formatting, restrictions on allowable hypertext markup tags, and requirements for predetermined web controls to include voice command information configured to allow users to select the web controls by voice command.

4. The system of claim 1, the at least one controller further programmed to:
   send a web request for the web content to a web server,
   receive a redirect from the web server to a vehicle-specific version of the web content, and
   retrieve the vehicle-specific version of the web content as the web content.

5. The system of claim 4, wherein the at least one controller is further programmed to provide user-agent information in a header of the web request indicating that the web content is for display by the VCS.

6. The system of claim 1, wherein the formatting information specifies at least two of: text size, button size, page background, element color information, total number of elements of web content, and position of elements of web content.

7. The system of claim 1, wherein the formatting information is implemented at least in part as one of: at least one cascading style sheet, information to be included in a cascading style sheet, and at least one template defining a presentation of elements of web content.

8. The system of claim 1 wherein the formatting information includes vehicle manufacturer branding information to be applied to the web content.

9. A computer-implemented method comprising:
   extracting voice commands from retrieved web content, the web content including hypertext markup tags and the voice commands defined for voice control of the hypertext markup tags;
   formatting the web content according to vehicle computing system (VCS) specific formatting information;
   providing the web content as formatted for display by the VCS; and
   updating a voice commands interface of the VCS according to the voice commands as extracted.

10. The method of claim 9, further comprising validating the web content as being in compliance with in-vehicle web standard requirements.

11. The method of claim 10, wherein the in-vehicle web standard requirements include at least one of: restrictions on allowable web formatting, restrictions on allowable hypertext markup tags, and requirements for predetermined web controls to include voice command information configured to allow users to select the web controls by voice command.

12. The method of claim 9, further comprising:
   requesting the web content from a web server,
   receiving a redirect from the web server to a vehicle-specific version of the web content, and
   retrieving the vehicle-specific version of the web content.

13. The method of claim 12, further comprising providing user-agent information in a header of the request indicating that request is for display by the VCS.

14. The method of claim 12, wherein the formatting information specifies at least two of: text size, button size, page background, element color information, manufacturer branding information, total number of elements, and position of elements.

15. The method of claim 12, wherein the formatting information is implemented at least in part by at least one of: at least one cascading style sheet, information to be included in a cascading style sheet, and at least one template defining a presentation of elements of web content.

16. A system comprising:
   a server configured to
      identify whether a received web request for web content is directed to a vehicle sub-domain for providing an in-vehicle-specific version of the content,
      identify whether the received web request is for presentation of web content via a vehicle computing system (VCS), and
      redirect the web request to the vehicle sub-domain when the request is not directed to the vehicle sub-domain and is for presentation via the VCS.

17. The system of claim 16, the server further configured to redirect the web request away from the vehicle sub-domain when the request is directed to the vehicle sub-domain and is not for presentation via the VCS.

18. The system of claim 16, further comprising identifying that the web content is for presentation via the VCS according to user-agent information included in a header of the request indicating that request is for display by the VCS.

* * * * *